B. ROBINSON.
Thill Coupling.
No. 78,609.
Patented June 2, 1868.
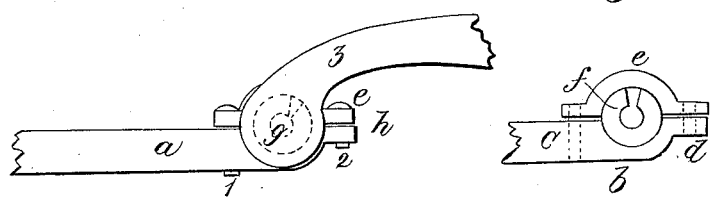
Witnesses:
Inventor:

UNITED STATES PATENT OFFICE.

BENJAMIN ROBINSON, OF THOMASTON, MAINE.

Letters Patent No. 78,609, dated June 2, 1868.

IMPROVED CARRIAGE-THILL.

*The Schedule referred to in these Letters Patent and making part of the same.*

TO ALL WHOM IT MAY CONCERN:

Be it known that I, BENJAMIN ROBINSON, of Thomaston, in the county of Knox, and State of Maine, have invented a new and useful Improved Carriage-Thill; and I hereby declare the following to be a full, clear, and exact description thereof, which will enable others to make and use my invention, reference being had to the accompanying drawings, forming part of this specification, in which—

Figure 1 shows a side view of my invention.

Figure 2 shows a side view of same with the shaft detached.

Same letters show like parts.

The object of my invention is to produce an improved method of attaching the thills to a carriage or other vehicle, which will prevent rattling, be protected from the action of the weather, and which may be easily adjusted, as the parts are worn away or loosened by friction. It is also my purpose to render the shafts of thills self-supporting, so that, when the horse is removed from the carriage, they may not rest upon the ground, in order to prevent the wear of the ends by dragging over the dirt or gravel.

I effect this in the following manner:

At $a$, fig. 1, is seen an arm, bar, or projection, which is to be securely bolted to the axle-tree of the vehicle. Near the extremity of this arm, as shown at $b$, fig. 2, is a transverse semicircular groove or cavity. At $c$ and $d$ in the same are bolt-holes, shown in dotted lines.

A trunnion-cap or box, as at $e$, fits over the groove, and is bolted to the bar $a$ by bolts passing through the holes $c$ and $d$. This also has a semicircular cavity, corresponding to that in the arm. On the inside of this cavity is fitted a strip of rubber, extending around the opening, as in fig. 2, at $f$. There is no removable bolt passing through the fork at the end of the thill, at $g$, as is usually the case, but, on the contrary, it is rigidly attached to it during the process of manufacture, and forms a part of it.

When the thill is to be attached to the vehicle, the strip of rubber $f$ is placed in the cap $e$, and both are passed around the stationary bolt in the shaft, then the rubber is placed in the semicircular cavity at the end of the bar $a$, the bolts passed through the corresponding holes in the cap and arm, and the nuts screwed tight. There will still be some space between the arm and trunnion-cap, and, as the rubber wears away, this may be diminished, and the wear compensated for by tightening the nuts. If the rubber should wear out, it may be easily replaced by a new strip.

The space between the cap $e$ and projection $a$ may be filled with an elastic strip.

My improved attachment, therefore, presents a novel feature, of being readily adjustable by means of bolts 1 and 2, and also of admitting a ready removal of the strip $f$. Neither do I employ a holding-strap, and a removable bolt through the same, but, in lieu thereof, the part $a$ and cap $e$, to operate as set forth. The shaft is unshackled from the axle by raising the cap $e$.

The projecting portion $h$ of the bar $a$ serves to sustain the thills when the horse is withdrawn therefrom, preserving the silvered caps, which are usually placed on the arms of vehicles, at the end of the same, from wearing away on the under side.

The advantages in the use of this attachment are, the rigid bolt $g$, passing through the ends of the arms, is brought in contact only with a soft substance, which protects it; and the bolt being rigidly fastened in the extremity of the shaft, holes are not required therein, which would tend much to weaken it, if used, and the sides of the forked end 3 of the shaft, together with the cap $e$, keep the rubber entirely from the weather.

I do not claim attaching rubber to a carriage-thill or clip, for this has often been done before, neither do I claim surrounding the bolt of the clip with a rubber cylinder to prevent rattling, and projecting the rubber beyond the holding-iron or strap to increase durability, as in patent No. 14,291, February 19, 1856, to Charles S. Pitman, but my invention relates to a new method by which the compression of the rubber around the rigid bolt $g$ on the end of the thill may be regulated and adjusted to degrees of wearing; neither do I claim the trunnion-cap or the other devices by themselves.

Although the rubber might for a time preserve the bolt $g$ tightly packed in its place, still, by reason of the almost incessant motion of the shaft, when in use, the bolt would, in time, wear out a space in the rubber, and so become loose. In consequence of this, a further improvement has been found necessary, namely, to effect the tightening and adjusting of the bolt and its packing, in order to preserve the joint in its original closeness for length of time, and to effect the ready removal of the packing, when the same is too much worn to be at all useful.

I do not claim a mode of attaching thills of vehicles to their axles, as shown in the patent of Charles B. Wood, No. 27,086, February 11, 1840.

This invention is different from mine, in having eyes attached to the inner ends of the thills, which are fitted to the clips, and allowed to turn freely thereon. It also differs from mine in having no elastic compressible packing, in order to render the device adjustable, as herein described. Still further, it differs in the fixed bolt in the bifurcated end of the shaft. It is also different in the purpose and operation, the said thills being so arranged that the eyes encompass the clips.

Neither do I claim securing the shafts of vehicles to the axles by means of two clamps encompassing the axle, and secured together by bolts; the clamps having fitted between their outer lugs, in grooves or bearings, a tubular arm, to which the plate of the shaft is connected, as shown in the rejected case of E. S. Scripture, filed December 1, 1853. In this invention there are two pairs of clamps, a hollow arm and plate, to each pair of shafts, one pair of clamps and plates connecting each shaft to the axle.

My invention has no relation to any new method of uniting the clip or the shaft to the axle-tree; but, in connection with the compressible packing not specifically claimed, it contemplates rendering the joint of the shaft with the clip adjustable, and at the same time the shaft self-supporting. But—

What I do claim as my invention, and desire to secure by Letters Patent, is—

The arrangement of the cap $e$ upon the projection $a$, the said cap being secured by bolts 1 and 2 in conjunction with the rubber piece $f$, the rigid bolt of the shaft, the sides 3 of the forked end of the shaft, the projection $h$, and either with the elastic strip, for the two purposes of rendering the shaft-holder adjustable and the shaft self-supporting, as described.

BENJAMIN ROBINSON.

Witnesses:
ATWOOD LEVENSALER,
WM. FLINT, Jr.